(12) United States Patent
Johnson

(10) Patent No.: US 7,658,183 B1
(45) Date of Patent: Feb. 9, 2010

(54) ENGINE AIR INTAKE AND FUEL CHILLING SYSTEM AND METHOD

(75) Inventor: Tommy Johnson, Pensacola, FL (US)

(73) Assignee: Supercooler, LLC, Gulf Breeze, FL (US)

( * ) Notice: Subject to any disclaimer, the term of this patent is extended or adjusted under 35 U.S.C. 154(b) by 116 days.

(21) Appl. No.: 11/486,634

(22) Filed: Jul. 13, 2006

(51) Int. Cl.
*F02M 15/00* (2006.01)

(52) U.S. Cl. .......................... 123/540; 123/541; 123/542

(58) Field of Classification Search .............. 123/41.02, 123/41.2, 41.21, 41.56, 41.57, 41.62, 563, 123/568.11, 568.12, 568.2, 556, 590, 592, 123/555, 41.19, 41.68, 540, 541, 542, 41.31; 60/599; 62/244, 245, 323.1, 323.2, 448, 62/449

See application file for complete search history.

(56) References Cited

U.S. PATENT DOCUMENTS

| | | | | |
|---|---|---|---|---|
| 3,203,158 A | * | 8/1965 | Zadra | 55/505 |
| 3,441,011 A | * | 4/1969 | Karl | 123/542 |
| 3,529,435 A | * | 9/1970 | Becker | 62/244 |
| 4,213,433 A | * | 7/1980 | Day | 123/549 |
| 4,385,496 A | * | 5/1983 | Yamane | 60/599 |
| 5,259,196 A | | 11/1993 | Faulkner et al. | |
| 5,353,597 A | | 10/1994 | Faulkner et al. | |
| 5,421,307 A | | 6/1995 | Andress et al. | |
| 5,871,001 A | * | 2/1999 | Pelkey | 123/542 |
| 6,006,540 A | * | 12/1999 | Coletti | 62/430 |
| 6,293,264 B1 | * | 9/2001 | Middlebrook | 123/563 |
| 6,318,118 B2 | * | 11/2001 | Hanson et al. | 62/512 |
| 6,367,284 B1 | * | 4/2002 | McCarville | 62/530 |
| 6,394,076 B1 | | 5/2002 | Hudelson | |
| 6,595,185 B2 | * | 7/2003 | Michels | 123/337 |
| 6,736,118 B1 | * | 5/2004 | Velke | 123/550 |
| 6,789,524 B2 | * | 9/2004 | Ino et al. | 123/337 |
| 2005/0196331 A1 | * | 9/2005 | Dove | 422/186.07 |

* cited by examiner

*Primary Examiner*—Michael Cuff
*Assistant Examiner*—Hung Q Nguyen

(57) ABSTRACT

A combustion engine intake air cooler system is disclosed that utilizes the vehicle air conditioning system to chill the engine intake air supply by conducting latent heat from the intake air passing through the intake air ducts using an external tubular induction coil in contact with and surrounding the air intake duct and connected to the vehicle air conditioning refrigeration system. Other embodiments include a refrigeration conduction coil located within a sealed and insulated, carburetor air breather and a refrigeration conduction coil in contact with the engine fuel line. An on board refrigerator using dry ice is also disclosed as a refrigeration system for the conduction coils when no vehicle air conditioning system is available. An intake air temperature sensing and control system is also provided.

17 Claims, 9 Drawing Sheets

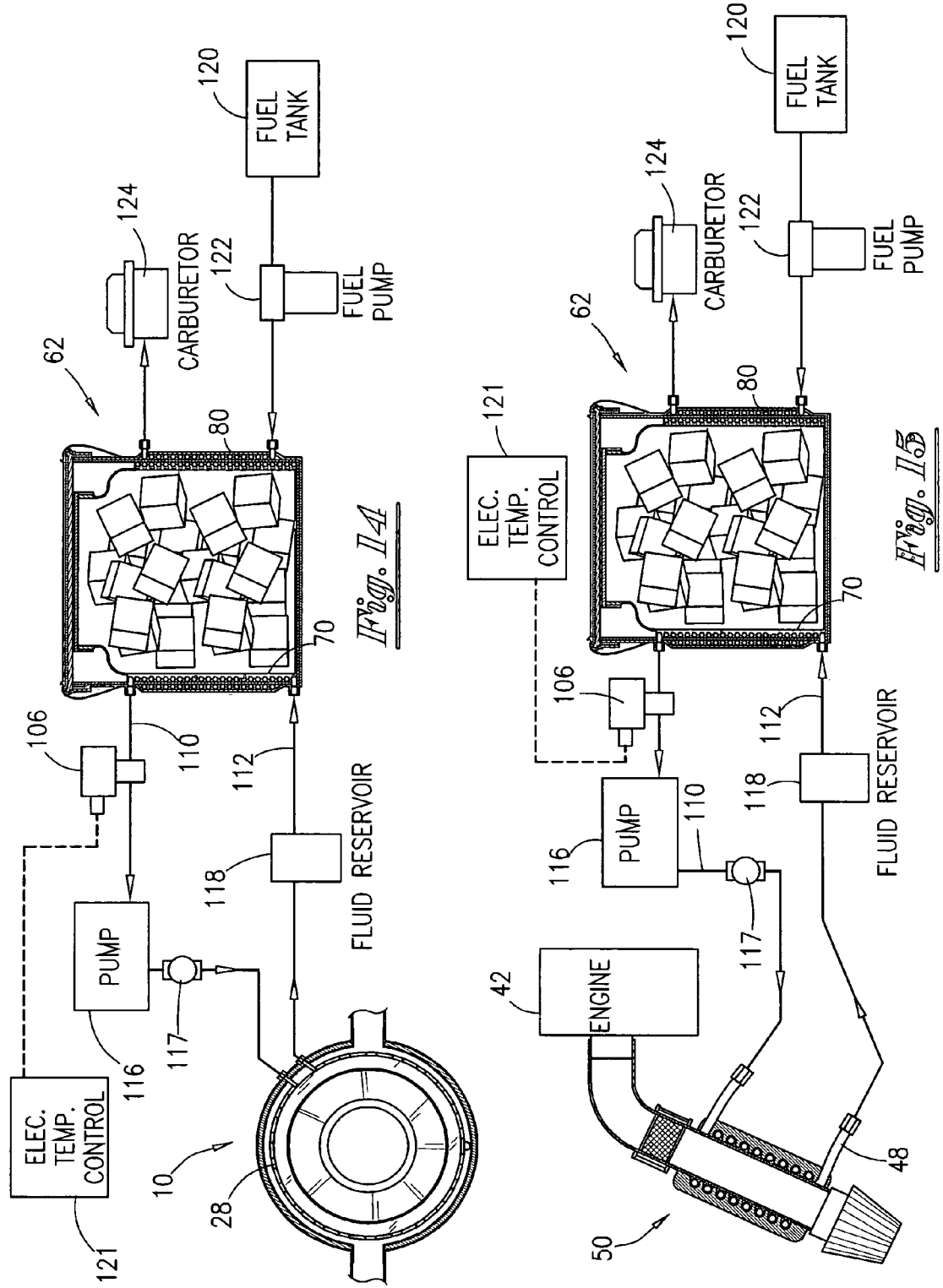

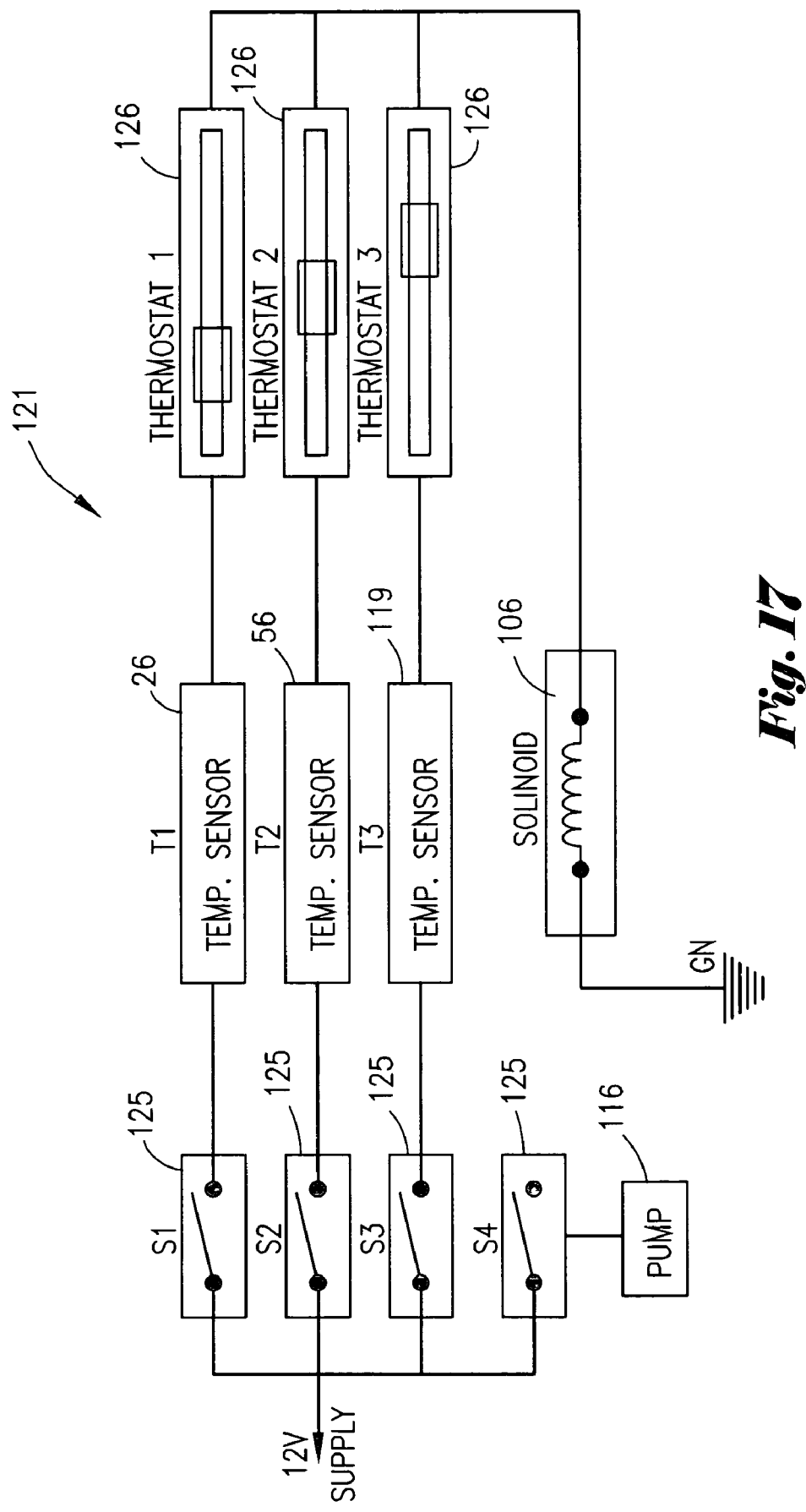

US 7,658,183 B1

ENGINE AIR INTAKE AND FUEL CHILLING SYSTEM AND METHOD

1. FIELD OF THE INVENTION

This invention relates generally to automobile engine cold air intakes and more particularly to the super chilling of the air being drawn into the engine by natural aspiration and the chilling of engine fuel.

2. GENERAL BACKGROUND

So called cold air engine intake products are designed to reroute intake air to the engine from a location outside the engine compartment. Such cold air intake tubes do reduce the temperature of the air entering the engine, through the carburetor or injection manifold. As a result of the differential between engine compartment temperature and the ambient temperature at speed the reduction is usually between 40 and 50 degrees. However, the engine intake air is only reduced to a percentage of the differential temperature, thus the true intake air temperature is generally about half of the differential temperature.

It is well known within the art that such cold air intake tubes are advantageous for engine performance. Cold air is much more dense than hot air and thus contains more oxygen which tends to improve combustion resulting in more power and improved fuel economy. Therefore, it is reasonable to assume that by controlling the engine's intake air temperature and the fuel temperature it is possible to increase engine efficiency. Various methods for achieving this have been used primarily for stabilizing the intake air temperature in freezing cold weather by inducing heat into the intake air. Others utilize exhaust pressure to turn turbines to compress and decompress air thereby reducing the temperature of the intake air to the engine. Although such devices may be effective to some degree there is no supporting evidence that they actually improve performance to any significant degree. Still other systems discuss the need to control the intake air temperature to an engine and provide various means for thermostatically controlling the intake air temperature without ever discussing a method of reducing the latent heat of the intake air to any significant degree. Therefore, there is a need to provide a simple and effective method for chilling engine intake air without any noticeable power loss.

3. SUMMARY OF THE INVENTION

One embodiment of the instant invention provides a renewable source of refrigerated air and a circulating system for removing latent heat from air flowing through the intake air ducts of an engine. Another embodiment utilizes the vehicle's air conditioning system to remove latent heat from air flowing through the intake air ducts of an engine. The heat transfer system further provides a method for reducing the temperature of the engine fuel entering the engine thereby further reducing engine temperature and improving performance.

4. BRIEF DESCRIPTION OF THE DRAWING

For a further understanding of the nature and objects of the present invention, reference should be made to the following detailed description taken in conjunction with the accompanying drawings, in which, like parts are given like reference numerals, and wherein:

FIG. 14 is a circuit diagram of the refrigeratory connected to the engine carburetor air breather cooling assembly and alternative fuel cooling system;

FIG. 15 is a circuit diagram of the refrigeratory connected to the engine intake air duct cooling assembly and alternative fuel cooling system;

FIG. 17 is an electrical diagram for temperature and pump control systems.

5. DETAILED DESCRIPTION OF THE PREFERRED EMBODIMENT

The engines eluded to herein are considered to be naturally aspirated engines with carburetors or fuel injection.

Figure 1:
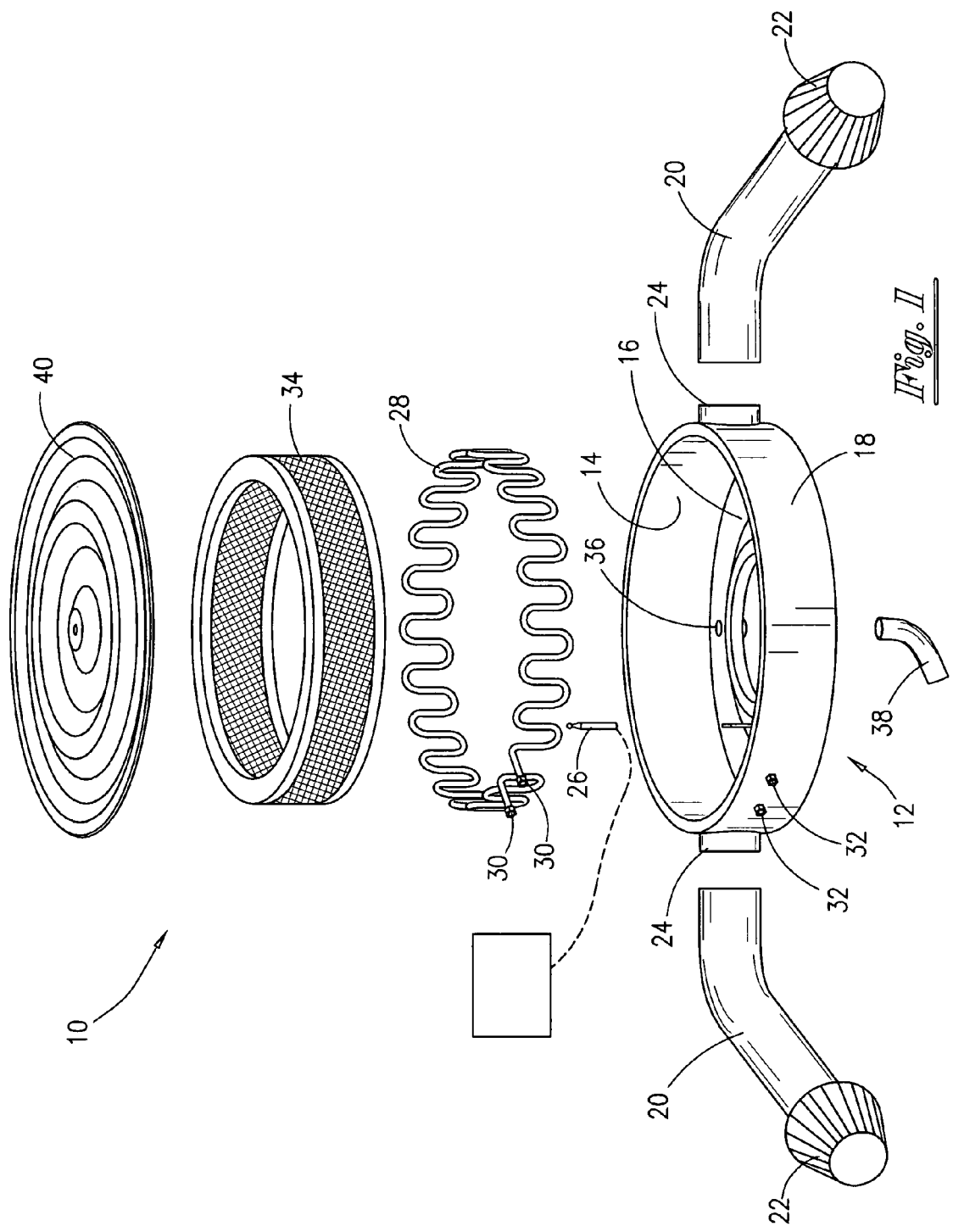
FIG. 1 is an exploded view of an engine air breather with duel high performance intake air ducts and refrigeration coil.

Looking first at FIG. 1 the carburetor air breather assembly 10 includes a container assembly 12 with a circular vertical wall 14 and a floor or catch basin 16 having a opening therein removably adapted to seal ably fit and cover the intake throat of an engine carburetor in the commonly accepted practice. The exposed exterior of the container assembly 12 is fully covered with an insulating material 18. Container assembly 12 may also be fitted with one or more air intake ducts 20 fitted with filters 22 at one end. One or more air intake ducts 20 may be attached to the ports 24. In cases where only one intake duct 20 is used any remaining ports 24 may remain sealed. Such intake ducts 20 are generally referred to (in the high performance accessories market) as cold air intake ducts used for rerouting intake air from within the engine bay to some point outside the engine bay generally at or near the wheel well or near the vehicle grill. It should be fully understood that no artificially chilled or refrigerated air is provided for induction into these air ducts. Only ambient air from outside the vehicle normally flows through these intake ducts.

Figure 2:
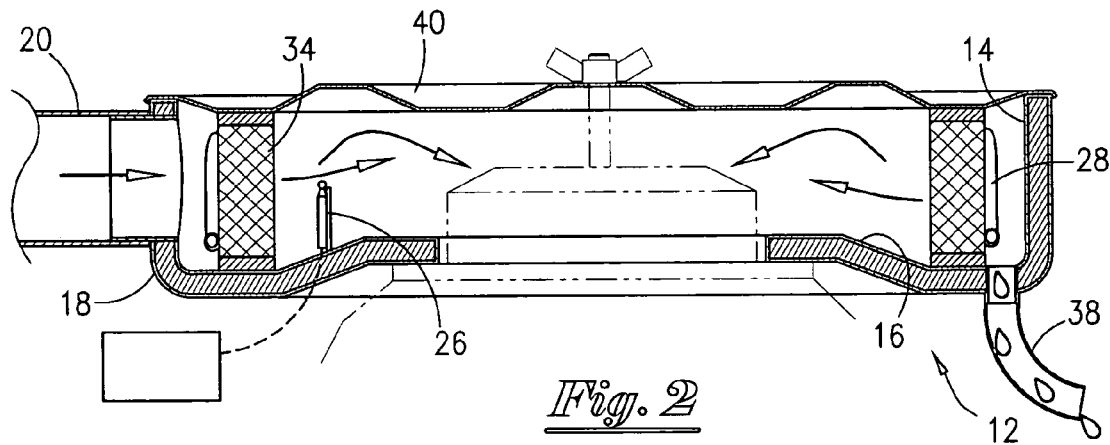
FIG. 2 is a vertical cross-section view of the engine air breather, shown in FIG. 1, showing air flow.
Figure 3:
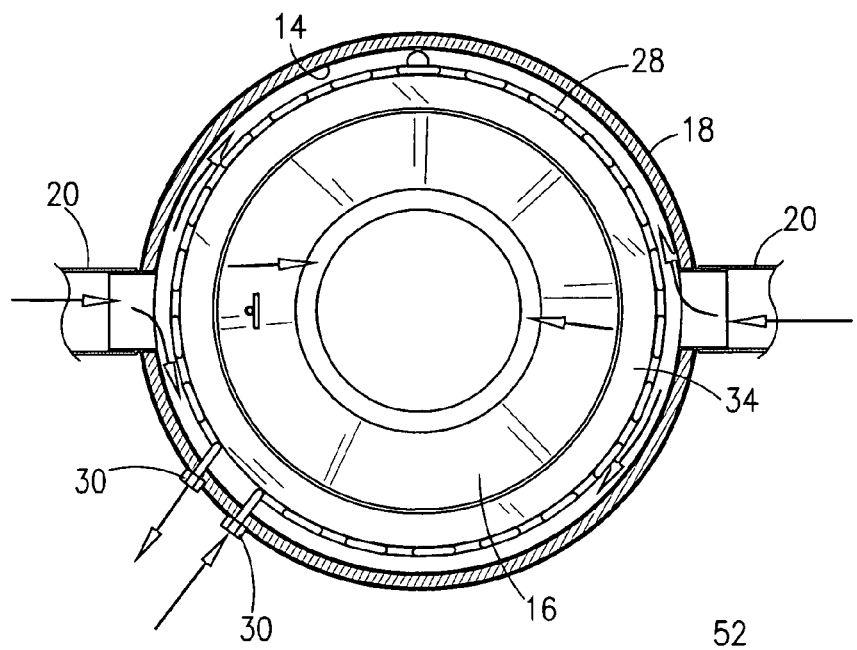
FIG. 3 is a horizontal cross-section view of the engine air breather, shown in FIG. 1, showing air flow.

An electrical temperature sensor element 26 may also be located within the container assembly 12 adjacent the opening leading into the carburetor. A tubular intake/breather filter coil (of the type whereby air is passed over a refrigerated coil) 28, preferably a ¼ inch aluminum line having a serpentine shape, with connection fittings 30 at each end is provided and located within the container assembly adjacent the vertical wall 14 with the fittings 30 protruding through ports 32 in the container assembly 12. Other coil configurations may be used to maximize the thermal induction exposure time to the intake air circulating within the container assembly 12. A ring shaped air filter element 34 is provided and located within the container assembly and within the loop formed by the intake/breather filter coil 28, but with sufficient space between the filter and the wall 14 to allow air to freely circulate between and around the filter 34 and the intake/breather filter coil 28, as shown in FIGS. 2 and 3. A drain port 36 is also provided in the floor or catch basin 16 to which a drain line 38 may be attached to drain away any condensate that may accumulate on the intake/breather filter coil 28. A removable cover 40 for the container assembly 12 is also attached in the accepted manner common to carburetor breathers thus sealing the container assembly 12.

Figure 4:
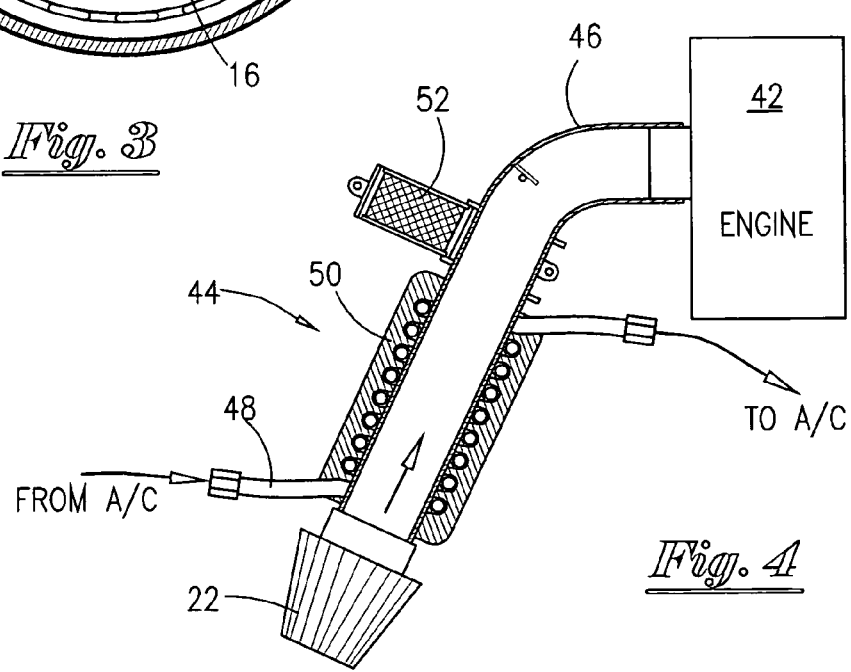
FIG. 4 is a longitudinal cross-section view of a fuel injection engine high performance air intake duct assembly with heat transfer coils and condensate collection filter.
Figure 5:
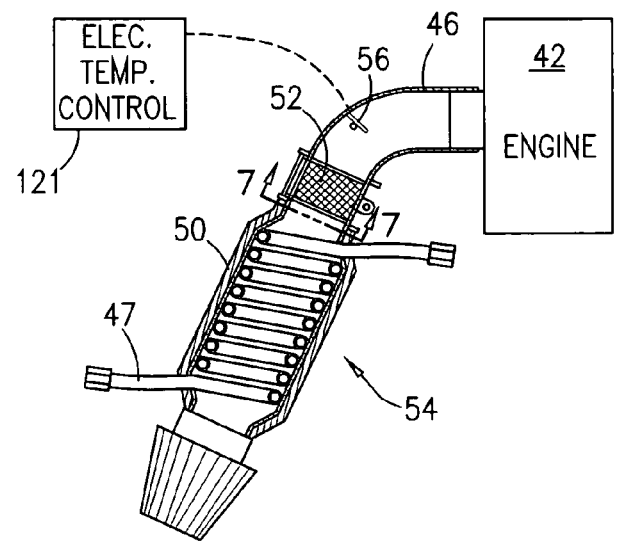
FIG. 5 is a longitudinal cross-section view of a fuel injection engine high performance air intake duct alternative assembly with internal heat transfer coils and condensate collection filter.

Looking now at FIG. 4 we see that air intake ducts for fuel injection engines may be replaced with a chilled air intake duct assembly 44. The chilled air intake duct assembly 44 includes a modified cold air induction duct 46, configured and routed in the accepted manner for ducting air from outside the engine bay to the engine. This intake air duct assembly 44 is equipped with a ⅜ inch tubular air intake duct coil 48, coiled externally around and in conductive contact with the exterior surface of the cold air induction duct 46 and covered with an insulating material 50. This arrangement allows thermal transfer of heat from the intake air to the cooler area of the intake tube surrounded by the induction cooling coil and thus carried back to the refrigeratory by means of a refrigerant or refrigeration medium. A removable condensate filter 52 may also be installed within the cold air induction duct 46 between the refrigeration line and the engine 42 to collect any condensate that may result from temperature differentials when the engine is shut off. Alternatively, an intake duct assembly 54 may be constructed in a manner where a tubular intake duct evaporator coil 47 is located within the cold air induction duct 46 thus improving latent heat transfer from the intake airflow directly to the intake duct evaporator coil 47 as shown in FIG. 5. A temperature sensor 56 is located between the intake duct evaporator coil 47 and the engine 42 to monitor the intake engine airflow temperature.

Figure 6:
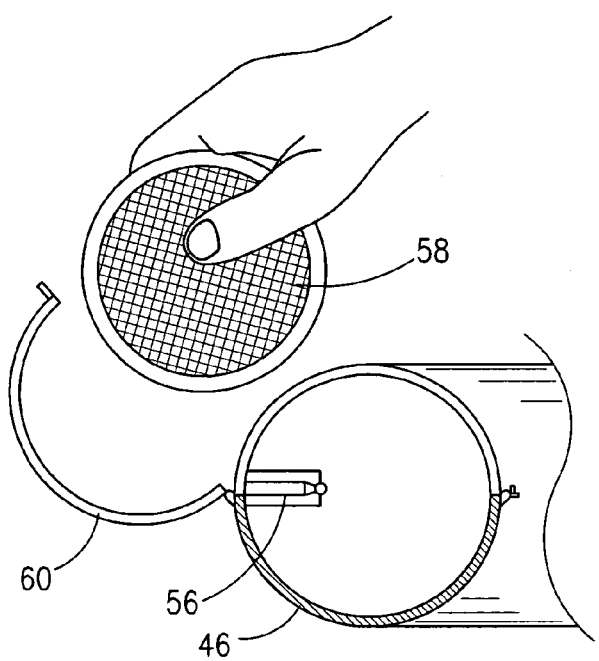
FIG. 6 is cross section expanded view of the removable condensate filter shown in FIGS. 4 and 5.
Figure 7:
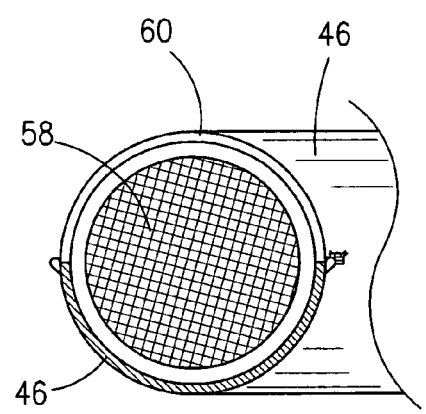
FIG. 7 is a horizontal cross-section taken along site lines 7-7 seen in FIG. 5

The inline condensate filter assembly 52 as further detailed in FIGS. 6 and 7 may be configured in various way as long as the filter is easily removable. The filter element 58 shown in FIG. 6 may be captured in a pivotal segment 60 of the cold air induction duct 46 and snapped into a locked position within the cold air induction duct 46 as shown in FIG. 7. The filter element 58 should be made of an open cell paper or cloth capable of capturing moisture. Other arrangements may include one-way drain valves or cloth bags etc.

Figure 8:
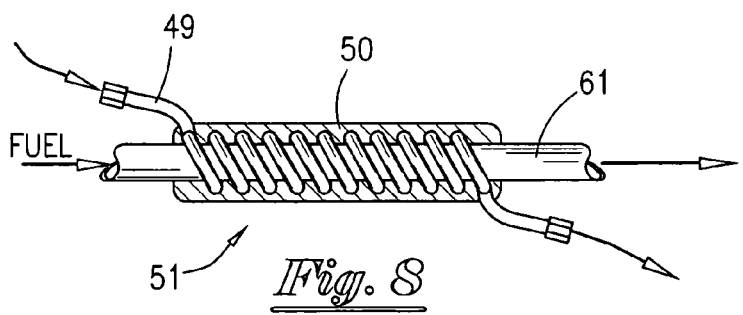
FIG. 8 is a partial section view of the fuel line cooling coil assembly.

As seen in FIG. 8 we have a fuel line chilling assembly 51 which includes a metal fuel line refrigeration conduction coil 49 used to chill the engine fuel as a result of latent heat transfer as the fuel passing through the fuel line 61 contacts the area of the fuel line chilled by the fuel line conduction coil 49. The fuel line conduction coil 49 should be fully covered with an insulating material 50. All lines leading to and away from the metal fuel line conduction coil 49 should be insulated as well.

Figure 9:
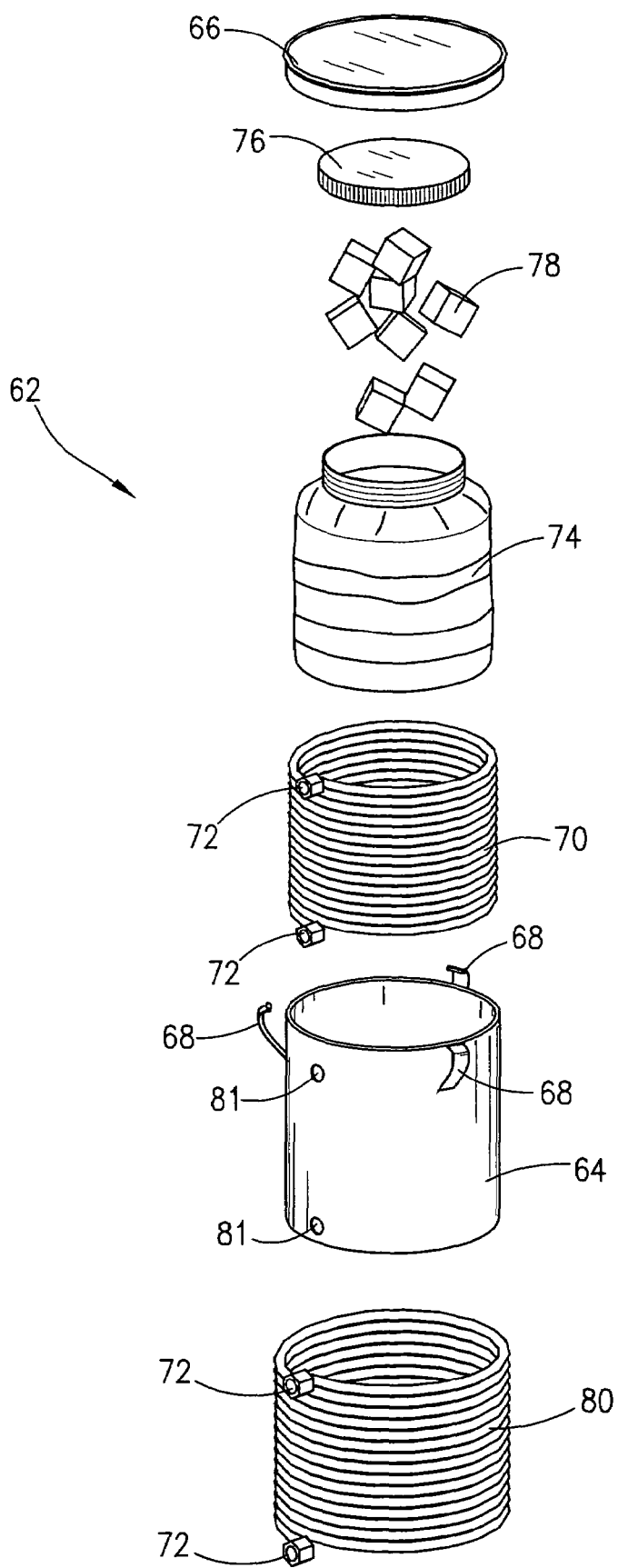
FIG. 9 is an exploded view of the refrigeratory.
Figure 10:
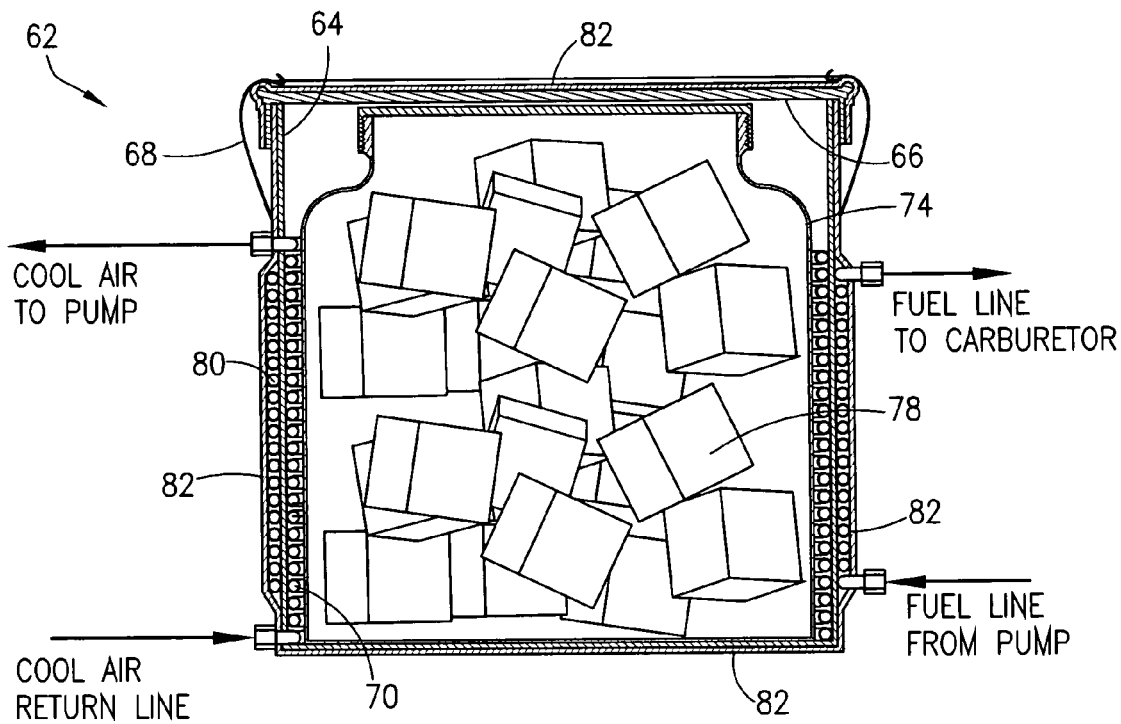
FIG. 10 is a vertical cross-section of the refrigeratory

Looking now at FIG. 9, which is an exploded view of a refrigeratory defined herein as an apparatus for cooling, a refrigeration means, or a refrigerator. Thus, a refrigeratory may include the refrigerator assembly 62 or a vehicle air conditioning system such as seen in FIG. 10. The refrigerator assembly 62 includes a metal, preferably aluminum, ice can/container 64 and a removable sealing lid 66 which may be snapped into place by clamps 68. A coil of ⅜-inch diameter ice can coolant coil 70 with fittings 72 at each end is located inside and in contact with the inner surface of the ice can/container 64. A collapsible, preferably rubber, bag 74 having a wide mouth and a removable insulated lid 76 is located within the ice can coolant coil 70. The bag 74 is used to contain ice 78 preferably solidified carbon dioxide (dry ice). Dry ice is extremely cold (about minus 79 degrees Centigrade) and does not melt; it only changes directly to a gas releasing $CO_2$. Therefore, vents must be provided in the lid 76. Since ports 81 are provided in the ice can/container 64 to allow the coil fittings 72 to protrude, any gas emitted by the dry ice can also escape around the tubing through these ports. A coil of ⅜ inch diameter ice can fuel coil 80 with fittings at each end may be provided and placed in contact with the exterior surface of the ice can/container 64. Seen in FIG. 10, an insulating material 82 is used to fully cover the ice can fuel coil 80 thereby protecting the coil and further securing it in position on the ice can/container 64.

The refrigerator assembly 62 fully assembled may be seen in FIG. 10. As seen here, the dry ice 78 may be packed into the collapsible bag 74 and placed inside the ice can/container for some period of time and may be replaced as necessary without disturbing the connections or shutting down the engine.

Figure 11:
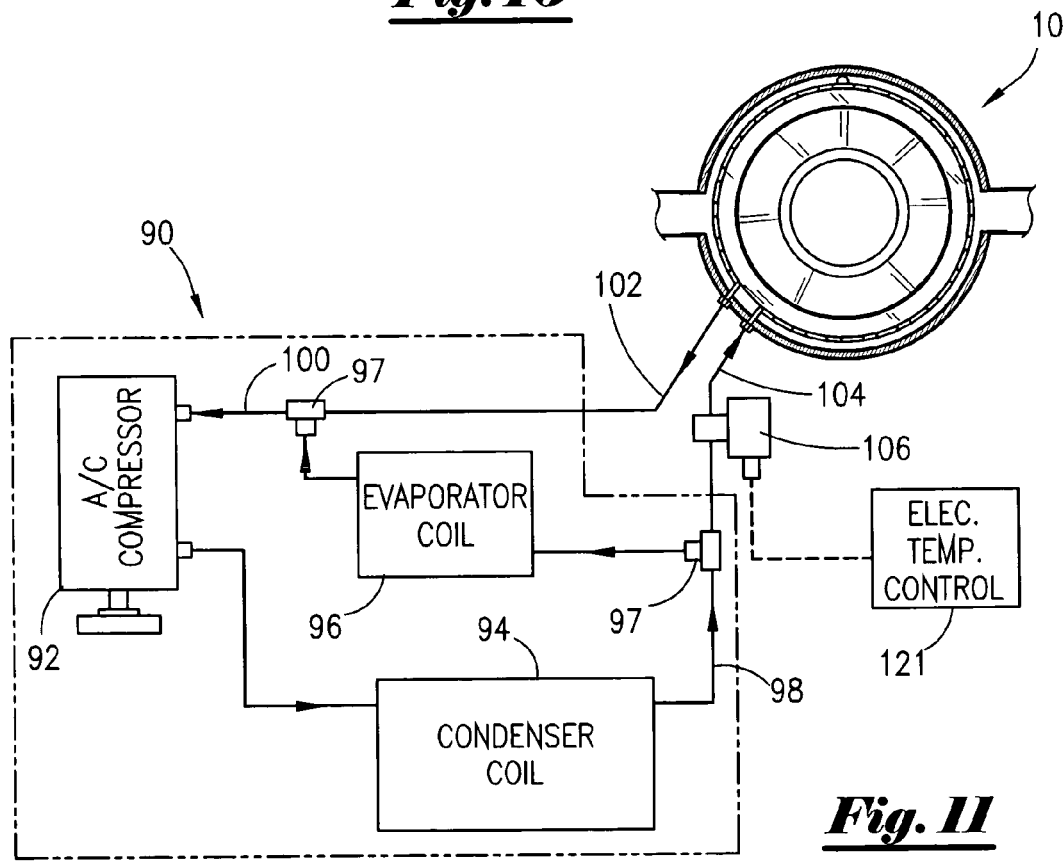
FIG. 11 is a circuit diagram of the AC system connected to a carburetor air breather cooling assembly shown in FIG. 1.
Figure 12:
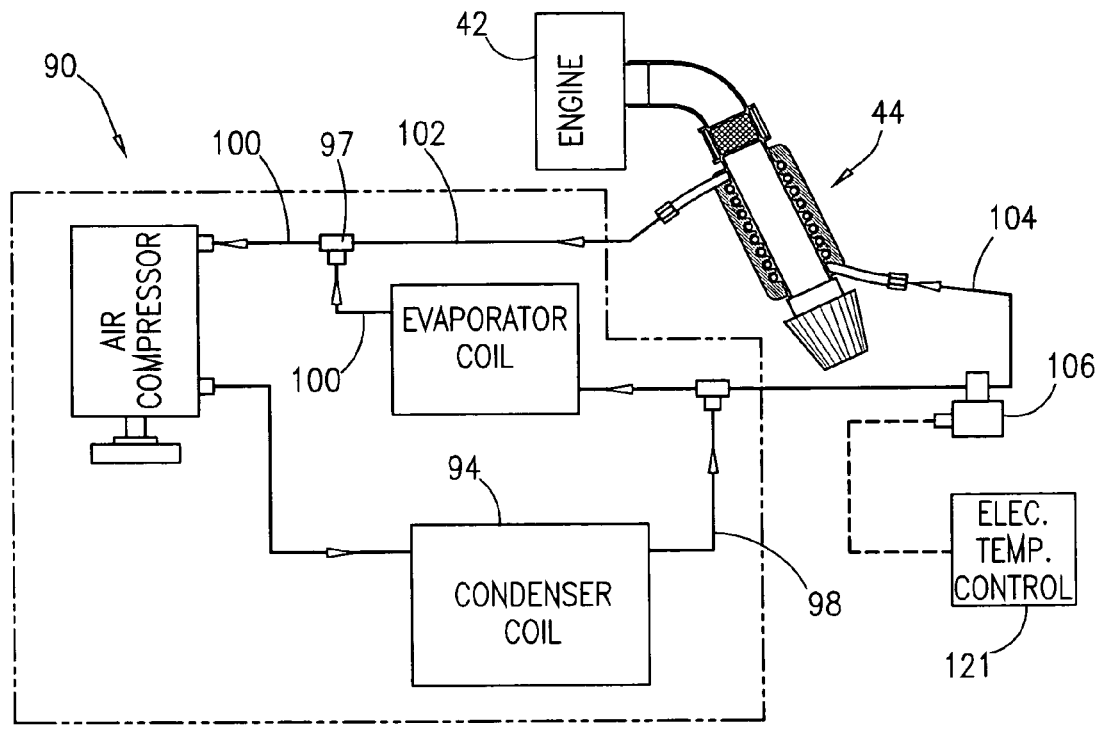
FIG. 12 is a circuit diagram of the AC system connected to the intake air duct cooling assembly.

As seen in FIG. 11 the refrigeratory or refrigeration system 90 is a vehicle air conditioning system having the basic cooling elements of a compressor 92, an AC condensing coil 94 and an AC evaporator coil 96. By using refrigerant line taps or tees 97 located within the high pressure line 98 connecting the AC condensing coil 94 to the AC evaporator coil 96 and within the low pressure line 100 connecting the evaporator coil 96 to the low side of the compressor 92, a parallel refrigerant circuit(s) may be established. Accessory circuits may be established by adding insulated refrigeration connecting lines 102 and 104. Inlet line 104 may be fitted with an insulated inline electrical solenoid valve 106. Such accessories may also include the intake/breather filter coil 28 located within the carburetor breather assembly 10 as seen in FIG. 11, the evaporator coil shown in FIG. 12 or a fuel line chilling assembly 51 or combinations thereof as shown in FIG. 13

Figure 16:
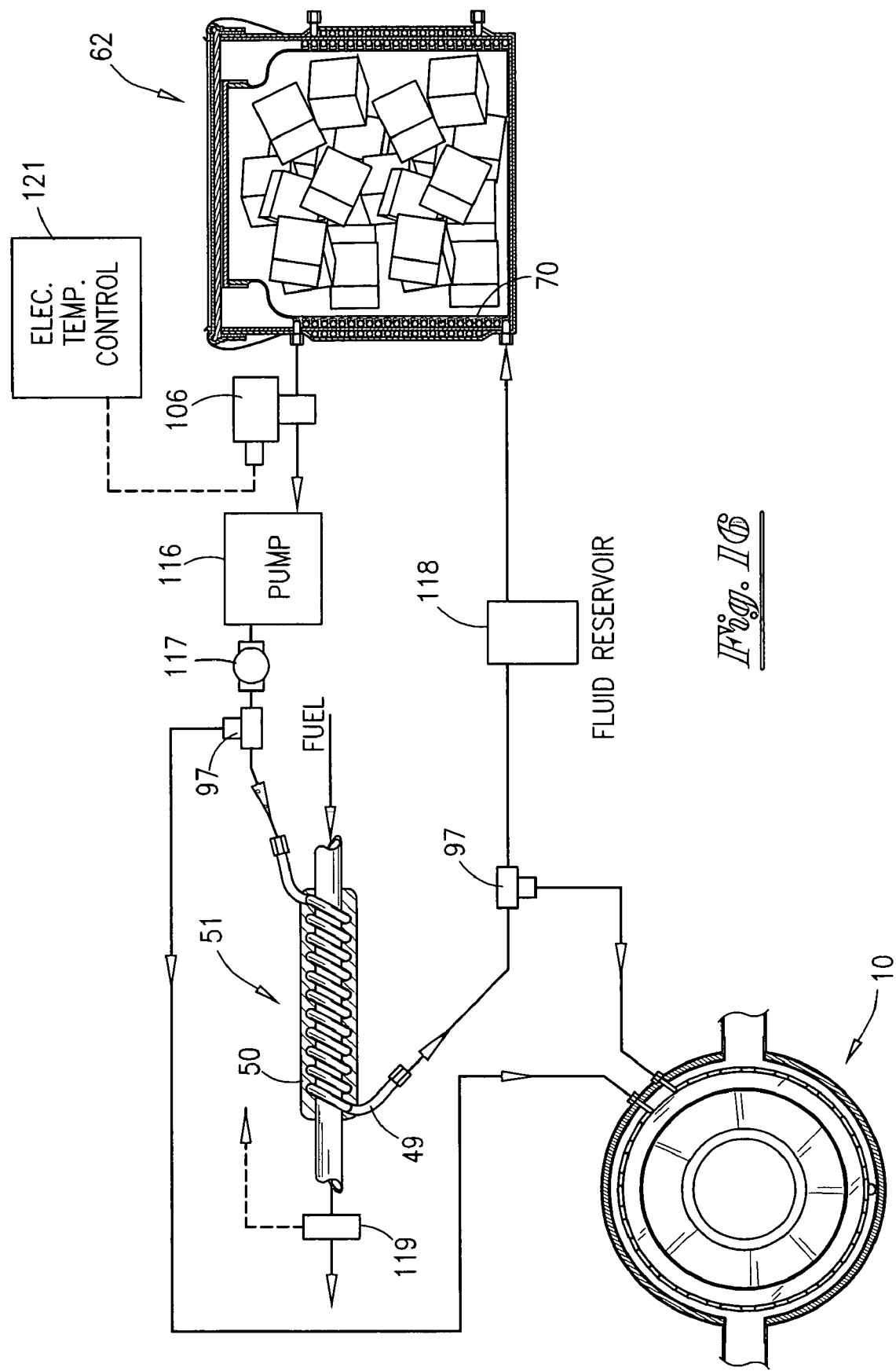
FIG. 16 is a circuit diagram of the refrigeratory connected to the fuel line latent heat transfer cooling system.

As may be seen in FIG. 14 where the refrigeratory is the refrigerator assembly 62 the ice can coolant coil 70 is connected to lines 110, 112 leading to and returning from the intake/breather filter coil 28, or air intake duct coil 48 and fuel line conduction coil 49 as also shown in FIG. 15, and FIG. 16 as a closed loop system. These closed loop systems include an electric temperature control solenoid valve, 106, an electric pump 116 and a site glass 117 located in the line 110 leading to the intake/breather filter coil 28, or air intake duct coil 48 and fuel line conduction coil 49 and a pressurized fluid reservoir 118, having a air purge valve, is located in the return line 112 leading to the ice can coolant coil 70. A mixture of three parts water and one part ethylene glycol or the like antifreeze solution is placed and sealed within the fluid reservoir 118.

In addition the engine's fuel may be cooled to some desired temperature by passing it through the external ice can fuel coil 80 connected in series with the fuel line leading directly from the fuel tank 120 and fuel pump 122 to the engine carburetor or fuel injection system as shown in FIG. 14, and FIG. 15. This is especially helpful when the engine is very hot and the fuel tends to vapor lock due to gasification of the fuel.

Figure 13:
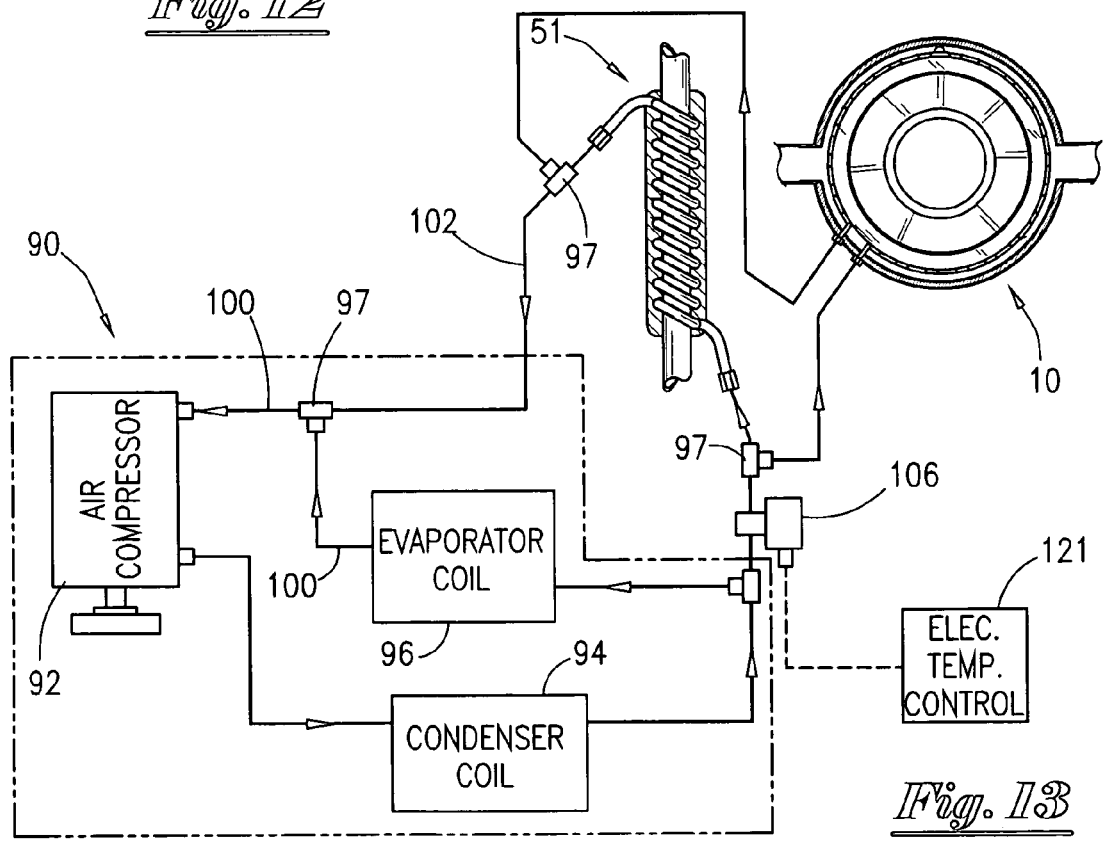
FIG. 13 is a circuit diagram of the AC system connected to the fuel line cooling assembly.

As described in FIG. 13 combinations of cooling coil accessories 10, 50, and 51 may also be connected in parallel to the refrigerator assembly 62 as shown in FIG. 16. A temperature sensor 119 should be placed within the fuel line.

A control diagram such as is shown in FIG. 17 is used to indicate an electrical control panel 121 for controlling the temperature of the various accessory-cooling elements. Each circuit involving one or more cooling elements 10, 50, 51 should be fitted with temperature sensors 26, 56, 119 having an appropriate temperature range. The sensors are then connected to an on/off switch 125 and to an adjustable thermostat 126, which is in turn, connected to the solenoid valve 106. An on/off switch 125 is also provided in the control circuit for the electric pump 116.

In operation the following observations in tables 1-3 have been made that seem to verify the cooling ability of the accessory coils and the performance benefits that may be derived as result of the temperature reductions.

TABLE 1

Temperature readings for '85 Mustang, 302 cu.
In. 4-barrel Carburetor with two fender well air
intake ducts to carburetor.
Without air chilling equipment

| | |
|---|---|
| Ambient temp. | 85 Deg. F. |
| Traveling temp. | 80 Deg. F. |
| Fuel line temp. | 95 Deg. F. |
| Engine compartment temp. | 144 Deg. F. |
| Engine temp. | 164 Deg. F. |
| Intake air to carburetor | 100 Deg. F. |
| Engine thermostat temp. | 180 Deg. F. |

TABLE 2

Temperature readings with Refrigerator

| | |
|---|---|
| Ambient temp. | 91 Deg. F. |
| Traveling temp. | 85 Deg. F. |
| Chilled fuel line temp. | 54 Deg. F. |
| Engine compartment temp. | 140 Deg. F. |
| Engine temp. | 142 Deg. F. |
| Intake air to Carburetor | 65 Deg. F. |
| Engine thermostat temp. | 180 Deg. F. |

TABLE 3

Temperature readings with AC to chill intake air
and fuel line

| | |
|---|---|
| Ambient temp. | 90 Deg. F. |
| Traveling temp. | 84 Deg. F. |
| Chilled fuel line temp. | 58 Deg. F. |
| Engine compartment temp. | 142 Deg. F. |
| Engine temp. | 141 Deg. F. |
| Intake air to Carburetor | 67 Deg. F. |
| Engine Thermostat Temp. | 180 Deg. F. |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An accessory chilling system adapted to a vehicle internal combustion engine air intake and fuel systems comprising:
    a) a fluidic non-pressurized chilling containment comprising:
        i) an elongated can having a removable cover;
        ii) an ice container having a removable lid located within said can;
        iii) a coiled tube portion of said fuel system thermal contact with and coiled externally around said can; and
        iv) an insulating material surrounding all exposed surfaces of said containment including said coiled tube portion;
    b) an engine air intake duct extending from the engine to a point outside the vehicle engine bay in a manner whereby external ambient temperature air is conducted to said engine;
    c) a first chilled water tube coiled externally around a portion of the engine air filter intake duct in thermal contact therewith connected to a second chilled water tube coiled within said containment so as to form a continuous closed loop with said first chilled water tube; and
    e) a liquid coolant located within said first and second chilled water tube.

2. The accessory chilling system according to claim 1 wherein said ice container is a collapsible ice bag having a removable lid said bag located within said containment.

3. The accessory chilling system according to claim 1 wherein said coolant comprises a mixture of three parts water and one part ethylene glycol.

4. The accessory chilling system according to claim 3 wherein said continuous closed loop further comprises a pump for circulating said coolant, an electric solenoid valve for controlling the flow of said coolant, a site glass for determining the presence of said coolant and a reservoir all connected in series within said continuous closed loop.

5. The accessory chilling system according to claim 1 wherein said engine air intake duct comprises a disposable inline condensate air filter located between said first chill water tube and said engine.

6. The accessory chilling system according to claim 5 wherein said disposable inline condensate air filter is retained by a pivotal holder.

7. The accessory chilling system according to claim 1 wherein said is connected in series within a fuel line leading from a vehicle fuel supply to said engine.

8. A method for reducing the temperature of engine intake air and engine fuel comprising the steps of:
    a) constructing a refrigeratory comprising a metal ice container having a vertical interior and external wall, a first tube coil member located within the ice container and a second tube member coiled around and in contact with the exterior wall of the container and a removable lid;
    b) insulating the ice container including the external tube member;
    c) constructing a collapsible ice bag, filling the ice bag with dry ice and inserting the ice bag within said ice container and the internal tube coil member;
    d) connecting the first internal tube coil member to a closed loop circulatory system comprising a tube coil member located externally around and in contact with an engine air intake duct, an electric solenoid valve, an electric pump, and a pressure reservoir;
    e) filling the pressure reservoir with a coolant comprised of water and ethylene glycol;
    f) circulating the coolant chilled by the dry ice through the closed loop system thus removing latent heat from the engine intake air; and
    g) connecting the second tube coil member located in external contact with the ice container in series to an engine fuel line at a location between the engine fuel pump and the carburetor and circulating the engine fuel through the second tube coil member thus extracting latent heat from the engine fuel by induction transfer through the walls of the ice container.

9. An accessory chilling system adapted to a vehicle internal combustion engine air intake and fuel systems comprising:
   a) an elongated thermal conductive tube member having first and second ends connected to each other forming a continuous closed loop having at least two coiled portions each having a plurality of loops,
   b) a liquid sealed within said thermal conductive tube member;
   c) a means for externally chilling one of said coiled portions conductively chilling said liquid sealed therein comprising an elongated thermal housing having a removable cover, one of said at least two coiled portions is located within said housing in thermal contact, therewith and an ice container having a removable lid and a vent, said ice container also located within said thermal housing in thermal contact said two coiled portions.

10. An accessory chilling system for a vehicle internal combustion engine air intake and fuel system according to claim 9 wherein said continuous closed loop comprises a serpentine portion in addition to said at least two chilled coiled portions, wherein said serpentine portion is located within a conventional engine air filter housing having a circular filter, wherein said serpentine portion encircling said circular filter, and wherein one of said coiled portions is located within said means for chilling.

11. An accessory chilling system for a vehicle internal combustion engine air intake and fuel system according to claim 10 wherein one said continuous closed loop coiled portion surrounds and is in thermal contact with an engine fuel line coil said serpentine coiled portion connected fluidly in parallel with said continuous closed loop.

12. An accessory chilling system for a vehicle internal combustion engine air intake and fuel system according to claim 9 wherein said conventional engine air filter housing further comprises at least one air intake duct extending outside a vehicle engine bay into ambient temperature air, each said air duct surrounded by and in thermal contact with at least one said chilled coil portion.

13. An accessory chilling system for a vehicle internal combustion engine air intake and fuel system according to claim 9 wherein said ice container is a collapsible bag.

14. An accessory chilling system for a vehicle internal combustion engine air intake and fuel system according to claim 9 wherein said continuous closed loop further comprises a pump for circulating said liquid, an electric solenoid valve for controlling the flow of said liquid, a site glass for determining the presence of said liquid and a pressure reservoir.

15. An accessory chilling system for a vehicle internal combustion engine air intake and fuel system according to claim 9 wherein said engine air filter housing comprises a condensate drain.

16. An accessory chilling system for a vehicle internal combustion engine air intake and fuel system according to claim 12 wherein said air intake duct is covered with an insulation material including said continuous closed loop coiled portions.

17. An accessory chilling system for a vehicle internal combustion engine air intake and fuel system according to claim 9 wherein said liquid comprises three part water and one part glycol.

* * * * *